US008667394B1

(12) United States Patent
Spencer

(10) Patent No.: US 8,667,394 B1
(45) Date of Patent: Mar. 4, 2014

(54) SYSTEM FOR GENERATING AN INTELLIGENT CROSS-PLATFORM DOCUMENT

(76) Inventor: William C. Spencer, Toms River, NJ (US)

(*) Notice: Subject to any disclaimer, the term of this patent is extended or adjusted under 35 U.S.C. 154(b) by 1000 days.

(21) Appl. No.: 12/142,671

(22) Filed: Jun. 19, 2008

Related U.S. Application Data

(60) Provisional application No. 60/945,058, filed on Jun. 19, 2007.

(51) Int. Cl.
*G06F 3/0481* (2013.01)

(52) U.S. Cl.
USPC ........... 715/700; 715/224; 715/226; 715/526; 715/222; 715/209; 707/769

(58) Field of Classification Search
USPC ......................................................... 715/700
See application file for complete search history.

(56) References Cited

U.S. PATENT DOCUMENTS

| | | | | |
|---|---|---|---|---|
| 5,987,480 | A * | 11/1999 | Donohue et al. | 715/207 |
| 6,507,848 | B1 * | 1/2003 | Crosby et al. | 715/200 |
| 7,072,055 | B1 * | 7/2006 | Carter et al. | 358/1.15 |
| 7,197,531 | B2 * | 3/2007 | Anderson | 709/203 |
| 7,313,757 | B2 * | 12/2007 | Bradley et al. | 715/222 |
| 7,496,839 | B2 * | 2/2009 | Duxbury | 715/243 |
| 7,734,995 | B1 * | 6/2010 | Saikaly | 715/200 |
| 2004/0015476 | A1 * | 1/2004 | Twaddle | 707/1 |
| 2004/0139400 | A1 * | 7/2004 | Allam et al. | 715/526 |
| 2004/0153462 | A1 * | 8/2004 | Bardwell | 707/100 |
| 2004/0199876 | A1 * | 10/2004 | Ethier et al. | 715/523 |
| 2005/0216526 | A1 * | 9/2005 | Kumagai | 707/201 |
| 2005/0216836 | A1 * | 9/2005 | Duke et al. | 715/531 |
| 2005/0273698 | A1 * | 12/2005 | Smith et al. | 715/511 |
| 2006/0080607 | A1 * | 4/2006 | Cohen et al. | 715/705 |
| 2006/0111990 | A1 * | 5/2006 | Cohen et al. | 705/32 |
| 2006/0132843 | A1 * | 6/2006 | Jim et al. | 358/1.15 |
| 2006/0178912 | A1 * | 8/2006 | Ferraro et al. | 705/3 |
| 2006/0224700 | A1 * | 10/2006 | Chory et al. | 709/219 |
| 2007/0091336 | A1 * | 4/2007 | Abad Peiro et al. | 358/1.9 |
| 2007/0156554 | A1 * | 7/2007 | Nikoley et al. | 705/35 |
| 2007/0156627 | A1 * | 7/2007 | D'Alicandro | 707/1 |
| 2007/0242282 | A1 * | 10/2007 | Hashimoto | 358/1.2 |
| 2008/0086692 | A1 * | 4/2008 | Berstis et al. | 715/736 |
| 2008/0155702 | A1 * | 6/2008 | Bala et al. | 726/27 |
| 2009/0094538 | A1 * | 4/2009 | Ringler | 715/760 |
| 2009/0282062 | A1 * | 11/2009 | Husic | 707/100 |
| 2009/0299204 | A1 * | 12/2009 | Hsieh et al. | 600/509 |
| 2010/0005008 | A1 * | 1/2010 | Duncker et al. | 705/27 |
| 2010/0067041 | A1 * | 3/2010 | Endruscheit et al. | 358/1.15 |
| 2010/0179962 | A1 * | 7/2010 | Schuster | 707/769 |

(Continued)

*Primary Examiner* — William Bashore
*Assistant Examiner* — Reza Nabi
(74) *Attorney, Agent, or Firm* — Volpe and Koenig, P.C.

(57) ABSTRACT

The present invention relates to a system for incorporating all or part of a database and/or data sources and data management interface into a transferable file that is in the form of a platform-independent, intelligent document and provides a user in real-time with a platform-independent file having data and a data management interface. The intelligent cross-platform document is generated by synthesizing information from diverse data sources, such as, but without limitation, database, architecture files, icons, images, reference data files, web links. The generation of the file encapsulated with data and an information management interface may be conducted in real-time and allows for all or part of an information management system to be transferred in a cross-platform file to a user that is not directly connected to the information management system.

9 Claims, 16 Drawing Sheets

(56) References Cited

U.S. PATENT DOCUMENTS

2011/0022496 A1* 1/2011 Johnson et al. ............ 705/26.41
2011/0295901 A9* 12/2011 Tormasov .................... 707/793
2012/0089659 A1* 4/2012 Halevi et al. ................. 709/201

* cited by examiner

SYSTEM FOR GENERATING AN INTELLIGENT CROSS-PLATFORM DOCUMENT

CROSS-REFERENCE TO RELATED APPLICATION(S)

This application claims the benefit of U.S. Provisional Application Ser. No. 60/945,058 filed on Jun. 19, 2007, for which the entire disclosure filed on Jun. 17, 2007, without limitation, is hereby incorporated by reference.

BACKGROUND OF THE INVENTION

1. Field of the Invention

This invention relates generally to database and information management systems (IMS), more particularly, to encapsulating data and a data management interface into an intelligent cross-platform document.

2. Description of the Related Art

With the advent of modern distributed utility systems in which even water and sewer systems are now being upgraded with modern feedback and control systems, while maintenance work is often subcontracted to distributed vendors, and police and fire fighters often have a need to know where vital system are located, the needs exists for an information system capable of delivering to emergency personnel and sub-contracted maintenance workers inform about various utilities including, but not limited to, data and voice communication, power and gas and water and sewer line information in real time and on a need to know basis. Furthermore, while initial access to such information may be provided via a communication link, it is recognized that use of such information may occur in locations such as underground tunnels or in remote locations where communication links cannot be maintained. Thus, the need exists for providing such information to workers even when communication links are not available.

SUMMARY OF THE INVENTION

The present invention relates to a system for incorporating all or part of a database and/or data sources and data management interface into a transferable file that is in the form of a platform-independent, intelligent document and provides a user in real-time with a platform-independent file having data and a data management interface. The intelligent cross-platform document is generated by synthesizing information from diverse data sources, such as, but without limitation, database, architecture files, icons, images, reference data files, web links. The generation of the file encapsulated with data and an information management interface may be conducted in real-time and allows for all or part of an information management system to be transferred in a cross-platform file to a user that is not directly connected to the information management system. Additionally, the file may be secured by authentication means such as, but not limited to, password authentication and/or a digital rights management (DRM) authentication. Furthermore, updates to the file made by the user may be transferred back and incorporated into the information management system.

BRIEF DESCRIPTION OF THE DRAWINGS

Other aspects, advantages and novel features of the invention will become more apparent from the following detailed description of the invention when considered in conjunction with the accompanying drawings wherein.

DETAILED DESCRIPTION

With reference to figures for purposes of illustration, the present invention relates to a system for incorporating all or part of a database and/or data sources and data management interface into a transferable file that is in the form of a platform-independent, intelligent document and provides a user in real-time with a platform-independent file having data and a data management interface. The words "cross-platforms," "platform-independent" and "portable" mean the same thing, and are used interchangeably in this patent disclosure. The intelligent, cross-platform document is generated by synthesizing information from diverse data sources, such as, but without limitation, database, architecture files, icons, images, reference data files, web links. The generation of the file encapsulated with data and a data management interface may be conducted in real-time and allows for all or part of an information management system to be transferred in a cross-platform file to a user that is not directly connected to the information management system. Additionally, the file may be secured by authenticating means such as, but not limited to, password authentication and/or a digital rights management (DRM) authentication. Furthermore, updates to the file made by the user may be transferred back and incorporated into the information management system.

For purposes of illustration, but without limitation, this invention will be described in relation to an information management system used in the field of information technology (IT) infrastructure management where the data includes Infrastructure Relational Management (IRM) data. An IRM information management system of the type suitable for this purpose is manufactured and sold by Planet Associates, Inc. of Neptune N.J., under model no. Planet Infrastructure Relationship Management (IRM) version 7.50 product, a product description is available at http://www.planetassoc.com/about_resources_prod.shtml and is incorporated herein by reference.

Figure 1:
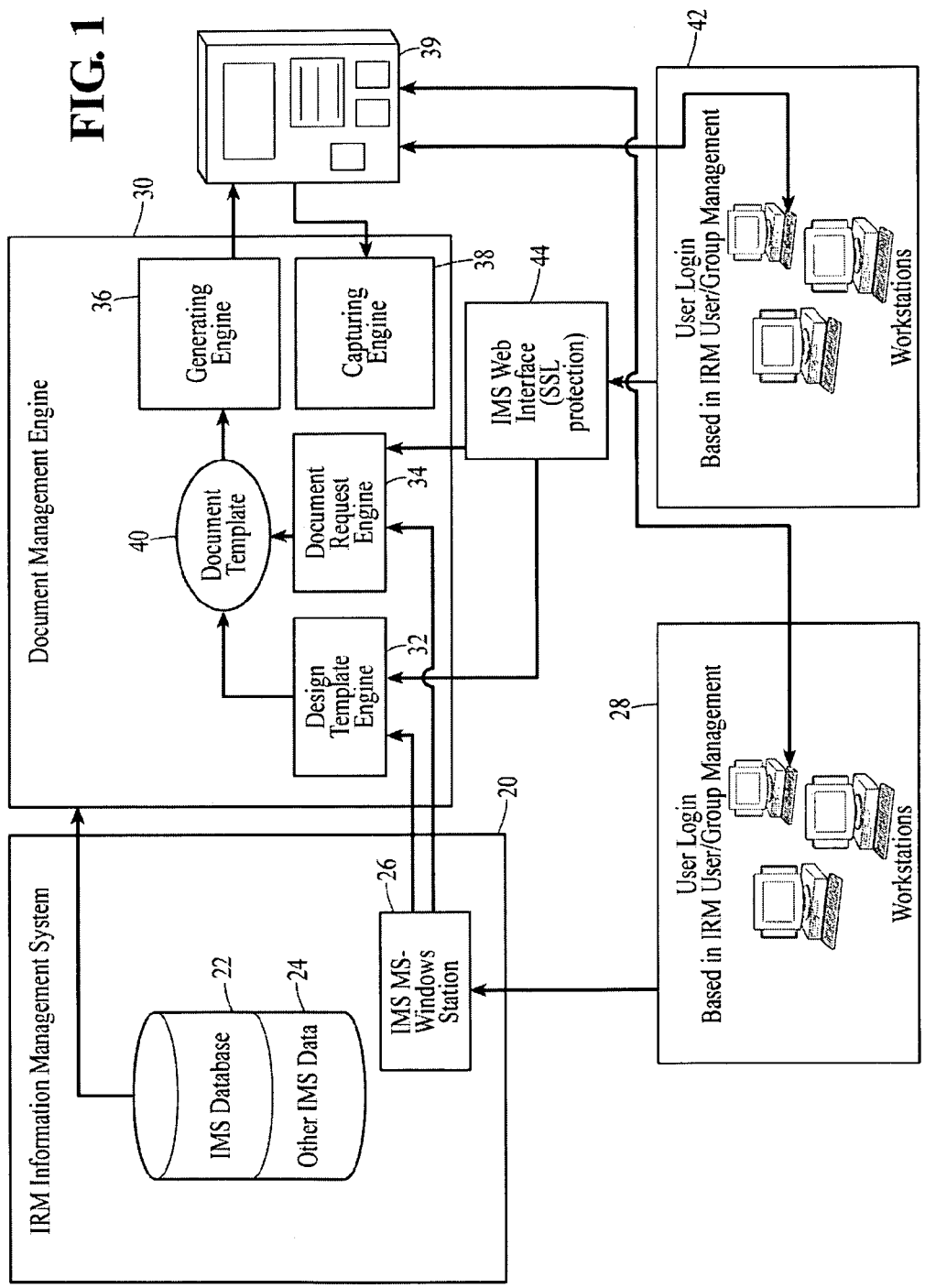
FIG. 1 is a functional block diagram of an IMS according to the present invention.

With reference to FIG. 1, an exemplary embodiment of the present invention includes an IRM information management system 20 having an IMS database 22 and other IMS data 24 accessible from both a computer running a local application and a computer running a Web based interface. The conventional Information Management System 20 connects to an intelligent document management system 30. Advantageously, a document generating and capturing system is included having generating engine 36 and capturing engine 38 for respectively generating and receiving transferable files in the form of intelligent documents 39. The documents are generated by synthesizing information from diverse data sources, such as, but not limited to, IMS database, architecture files, icons, images, reference data files, web links in real-time. Specific analytical information can also be computed from one or more IMS data sources and incorporated into these documents in real-time. Examples of analytical information are: circuit analysis or power analysis from an IT infrastructure database. Intelligent portable document generation relies upon document templates 40 that serve to define the make-up of the document. Users connecting with access rights as template authors either a desktop application 28 via an IMS application interface or web accessible computers 42 via a secure web-based interface 44 are able to edit new templates through the Design Template engine 32. It will be appreciated by those skilled in the art that user access rights management granted at login controls access to these engines 32 and 34 by the users. A document template from a library of document templates 40 created by the Design Template Engine 32 is input into the generating engine 38 and defines the parameters that will make up the intelligent document that is created. Advantageously, users via either desktop application 28 or web accessible computers 42 can request an intelligent document from the Document Request Engine 34. Users are typically associated with one or more templates at login where each template defines the parameters of the Intelligent Document delivered to the user's computer. The transferable file is intended to be independent of the computing device hardware used by the user. In this way the user is provided with database information and an information management interface and information management tools for viewing and using the database and other data information in the file. The file further allows for information to be updated by the user and transferred back to the IMS using a capturing engine.

As described, this solution is believed to address several novel problems found in, but not limited to, infrastructure management, namely:

In emergency situations, it is often difficult to disseminate critical infrastructure information quickly to an extended or remote user base working in the field, leaving first-line responders waiting idly while critical minutes pass.

Even if an organization's data is consolidated in a Configuration Management Database (CMDB), such as the type used by Planet IRM, access is typically constrained to local clients with a direct server connection, often with limited export capabilities (limited to basic or static reports, spreadsheets or static sketches).

Getting accurate, up-to-date information to the users in the field may take an extensive period of time (i.e., it is by no means real-time).

Thus, where a database includes information that may be useful to third parties or other users that are remote, namely, not in communication with a database of information, there is presently no way to give such users access which may be limited for security reasons or, if users are in the field, such users to not always have wired or wireless communication links to the database readily available. The present invention provides a way for users access to critical database information, an access interface and management tools for using such information to perform a task in real time. When used for infrastructure management, it is often the case where users in the field on a WiFi network, regional users, affiliates and sub-contractors may have a need for infrastructure management information. The use and availability of this information often requires that the information be delivered instantly upon request and in real time.

Furthermore, intelligent portable documents can be viewed using a portable document enabled web browser, such as, but not limited to, Microsoft Internet Explorer, Firefox, Mozilla, where the browser uses an appropriate plug-in, if needed, and portable document viewer of the type such as Adobe PDF Reader, without requiring any application software that normally works on data sources, such as Planet IRM application on IT infrastructure database or AutoCAD application on architecture files, etc.

In a presently preferred embodiment of the present invention, intelligent document is formatted in Adobe PDF version 1.6 format for portable documents. This version of PDF allows for the generation of 3-D graphics that has been applied in a novel way by the templates to render the intelligent documents. A full description of the Adobe PDF version 1.6 format is described in the book entitled "PDF Reference, Fifth Edition, Adobe PDF version 1.6", by Adobe Systems, Inc. (2005) ISBN #0-321-30474-8, which is incorporated herein by reference. However, it will be appreciated by those skilled in the art that the intelligent document format is not limited to, nor dependent upon, the Adobe PDF format; the same features of the invention can be implemented with other portable document formats, such as, but without limitation:

Microsoft XML Paper Specification (XPS)—which is further described at http://www.microsoft.com/whdc/xps/default.mspx; or OASIS/ISO OpenDocument Format—which is further described at http://opendocumentfellowship.com/files/odf_and_competition_21.pdf.

The Adobe PDF version 1.6 is presently preferred due to the wide acceptance of this industry-standard format widely available on various platforms of the type including, but no limited to, Windows PCs, Macintosh computers, Linux computers, and PDAs. A specific embodiment of this invention is provided in Planet Associates' Intelligent Infrastructure PDF (iiPDF) product (unpublished) under development. Two draft versions of online User Guides for iiPDF product provide details of iiPDF product and user interface; these User Guide files are:

iiPDF.rtf file; this is the on-line User Guide for iiPDF users using Planet IRM product; and webiiPDFOnlineHelp.doc; this is the on-line User Guide for iiPDF users using Planet evolution web interface.

A complete description of these documents may be found in U.S. Provisional Application Ser. No. 60/945,058, which is incorporated herein by virtue of the incorporation by reference made above.

Figure 2:
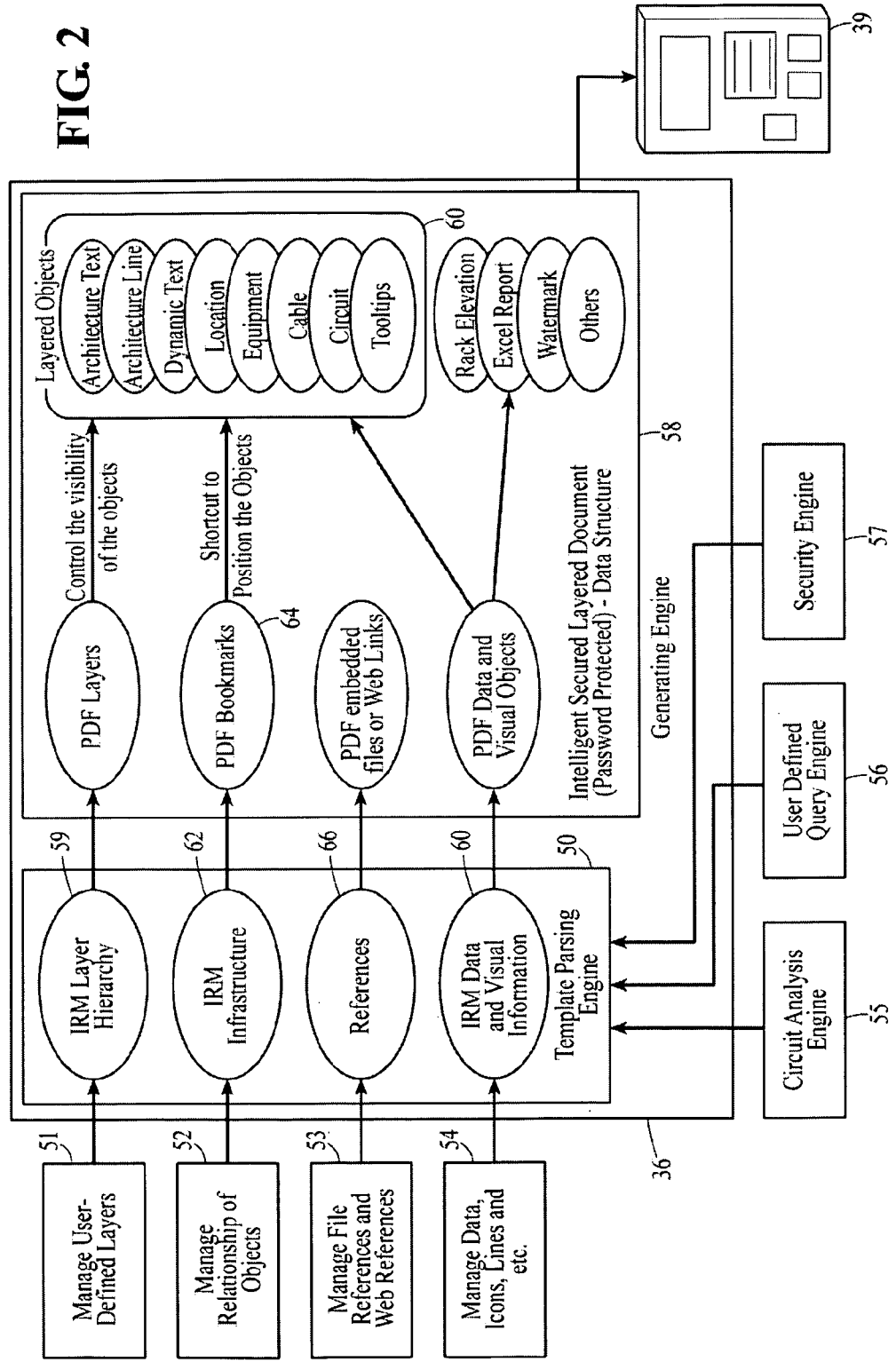
FIG. 2 is a functional block diagram of an export engine according to the present invention.

With reference to FIG. 2, an exporting engine 36 suitable for delivering information instantly and in real time using the Adobe PDF version 1.6 format includes a template-parsing engine 50 that obtains a template in response to an authenticated user's request. The template-parsing engine cooperates with sub-engines 51-57 to obtain information from the IMS database 22 and other data 24 (FIG. 1) that is incorporated into the data structure 58 (FIG. 2) of an intelligent document and formatted in an standardized cross platform format. The template parsing engine includes a manage user define layers engine 51 to incorporate the layers of IRM data 59 according to the Layer Hierarchy of the IMS database. These layers of information are then transformed into layered objects 60 of within the intelligent document. These layer categories include by way of example, Architecture Text, Architecture Lines, Dynamic Text, Location, Equipment, Cable, Circuits and Tool tips. It should be noted that each of these categories may be further broken down into subcategories that may include, but are not limited to, manufacturer type, IT service provider, data type, service type, or other criteria that is deemed relevant to the end user. Furthermore, a manage relationships engine 52 generates a map for the rapid navigation of the various layers according to the IMS database infrastructure 62. This map is embedded in the form of bookmarks 64 that allow the users to quickly navigate to important information contained in the layers. For example, if the template was designed for a maintenance crew to run diagnostics on various network gateways, the bookmarks could be filled with shortcuts to each gateway device to be handled by the maintenance crew that day. A manage file references and web references engine 53 parses other IMS data 66 that is to be embedded in the intelligent document. For example, a spreadsheet could be incorporated with fields for entering diagnostic test results. Or links of a GPS device connected by Bluetooth or a commercial map website such as Google Maps could be embedded that would when activated provide location information and driving directions to the equipment. Furthermore, rights may be included in the intelligent document to permit users to edit and save embedded files back into the intelligent document. A overall data management engine 54 ensures that data collected 68 and distributed in the intelligent document is integrated in a visually intuitive manner and scaled appropriately with other information in the system. This engine operates to conform a visual integration between both the layered objects as well as links to embedded documents such as rack elevation graphics, excel files, watermarks and other information. A Circuit analysis engine 55 ensures that the topology of the IT information is properly integrated according to the access rights granted to the user. The user defined query engine 56 cooperates with the various data collection management engines to ensure that the data parsed into the intelligent document is consistent with the access rights grants to the user. Finally, a security engine 57 provides secure access rights to an access regime for opening the intelligent document. The security level and method is defined by the template and an access regime of the type suitable for this purpose may include password protection, a digital rights management key and/or a secure connection to the intended receiving user. Once the data structure 59 of the intelligent document 39 is created, an intelligent document 39 is created using a real time snapshot of the IMS database and other IMS data. In will be appreciated by those skilled in the art from this description that the term "intelligent document" is used to describe the following features:

1. A traditional document is flat document in which it is difficult to manage object hierarchy based on one single file, and difficult to control by the user.

2. The document structure contains optional content which allows the user to visually filter out some contents in the real-time, thus even allowing for one page of a single file can have different information when viewed even on a print-out.

3. The bookmarks of the document structure are constructed based on a user-defined object hierarchy which allows the user to easily view their business information logically through a bookmark tree, position the data in the document, and link to useful embedded documents or links such as a web link.

4. The document structure contains data information based on user-defined algorithms in the template that allows users with template editing rights to generate different documents by simply applying different algorithms.

Figure 3:
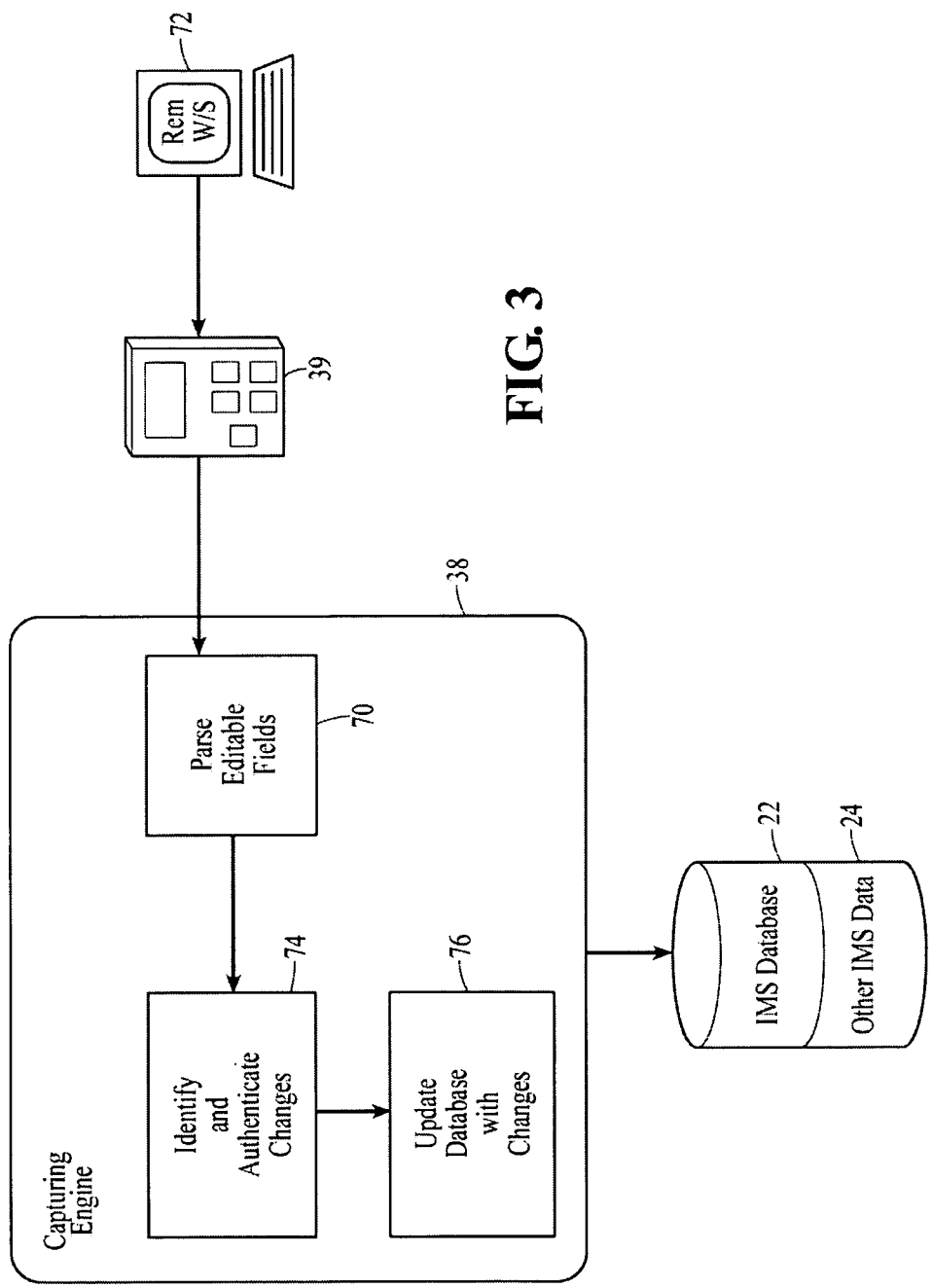
FIG. 3 is a functional block diagram of an importing engine according to the present invention.

As illustrated by FIG. 3, an importing engine 38 upon receiving a transferable file 39 parses the information into a manageable form 70 from a user 72, identifies and authenticates 74 the changes made by the user (not shown) and updates the database with the user provided information 76. It should be noted that depending upon the configuration of the system and the reliability of the user, the identify and authenticate may require human input using the IMS to review the changes before updating the IMS database 22 and other IMS data 24 to deter corruption of the database with erroneous information.

Figure 4:
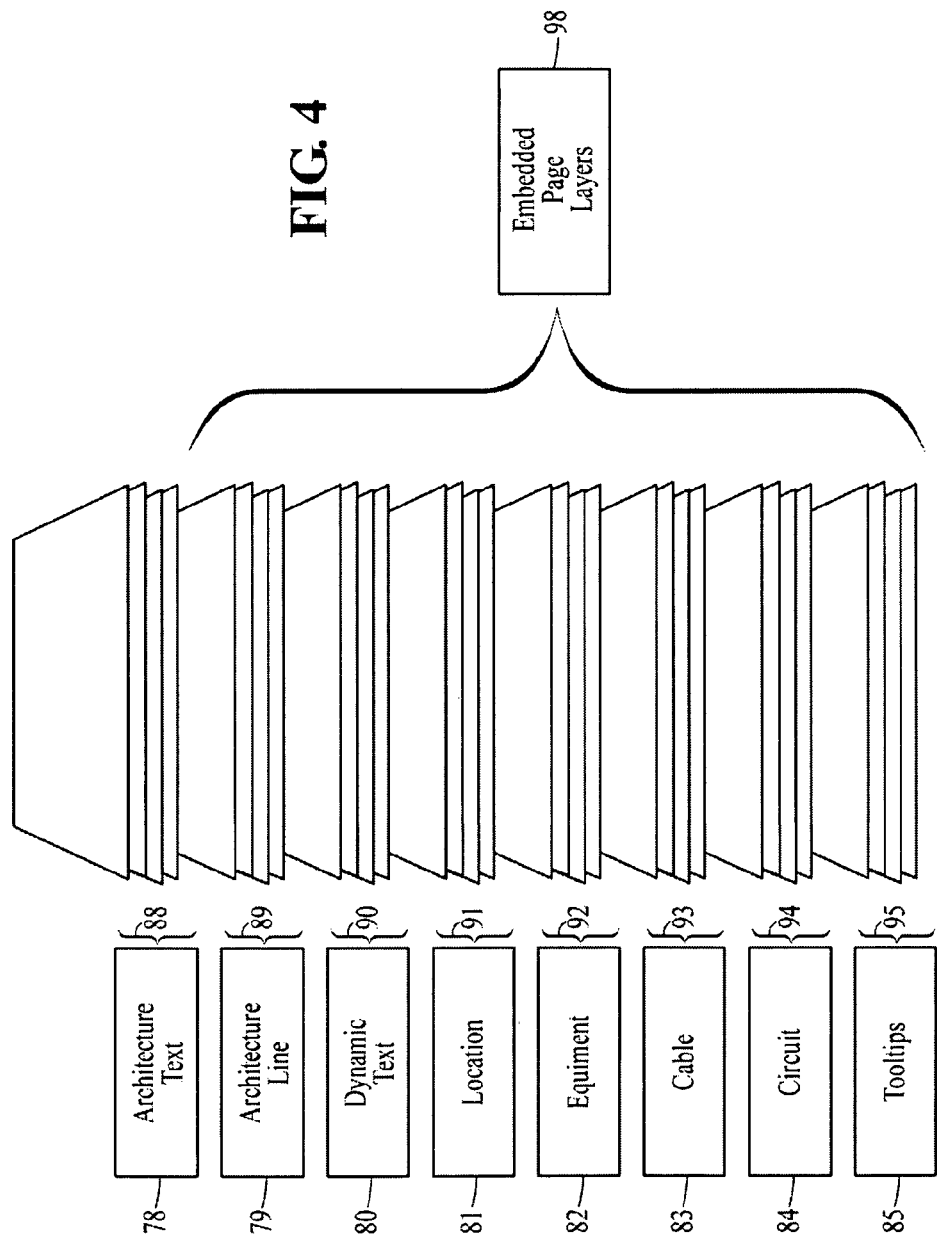
FIG. 4 is a block diagram of an intelligent document according to the present invention.

With reference to FIG. 4 and by way of example in the case of an exemplary infrastructure relationship management (IRM) database for an IT infrastructure, infrastructure information is tied together from Architecture Text 78, Architecture Lines 79, Dynamic Text 80, Location 81, Equipment 82, Cable 83, Circuits 84 and Tool tips 85. A feature of a Planet IRM database is the way in which a user interacting with an IRM database through the IRM IMS can seamlessly navigate using a visual interface from a topology showing a wide area network configuration to the topology and equipment inventory for an individual rack of information. A challenge was to find a way to give that same seamless navigational feel to remote users without the need to provide them access to the database in real time, as it was impracticable for many users in the field. One solution was developed to represent all information on a plane for viewing simultaneously on a single topographical map in which various kinds of information were represented as layer categories 88-95 embedded and scaled to form a single viewable page of information 98. The end user then can access information about the IT infrastructure on the whole network or for an individual rack simply by changing the scale of the page shown. Metadata data that can be used for tying in interactive tools and files formatted for third party applications may be embedded in these pages. The Adobe Acrobat software package for producing portable document format (PDF) files that are readable on any platform having a corresponding Adobe Reader application was enhanced to include an embedded page layer feature. To achieve platform independence by the end-user the Import/Export system of the present invention is capable of generating transferable files. In the presently preferred embodiment, but not by way of limitation, the transferable files are in the form of Acrobat version 7.0 PDF files. As such, the tools and navigational user interface has been adapted to cooperate and augment the tools and user interface provided by the Adobe Reader software for PDF files. A preferred PDF rendering engine of the type suitable for generating Acrobat Version 7.0 PDF files is PDFlib manufactured by:
Company name: PDFlib GmbH,
Address: Tal 40, D-80331 Munchen, Germany
Web: www.pdflib.com With reference to FIG. 5, an exemplary display of an intelligent portable document derived from an IRM database includes viewable database information rendered in a map topology 100, navigation tools 102, folder-nested index of bookmarked equipment 104 and attached files 106 for use in a third party application. The map view includes a view of equipment in which mouse-over pop-ups 108 provide additional information. By way of a real world example, a maintenance crew dispatched to provide router testing could use this encapsulated file on a touch screen WiFi enabled PC tablet to locate all of the routers in a county.

Figure 6:
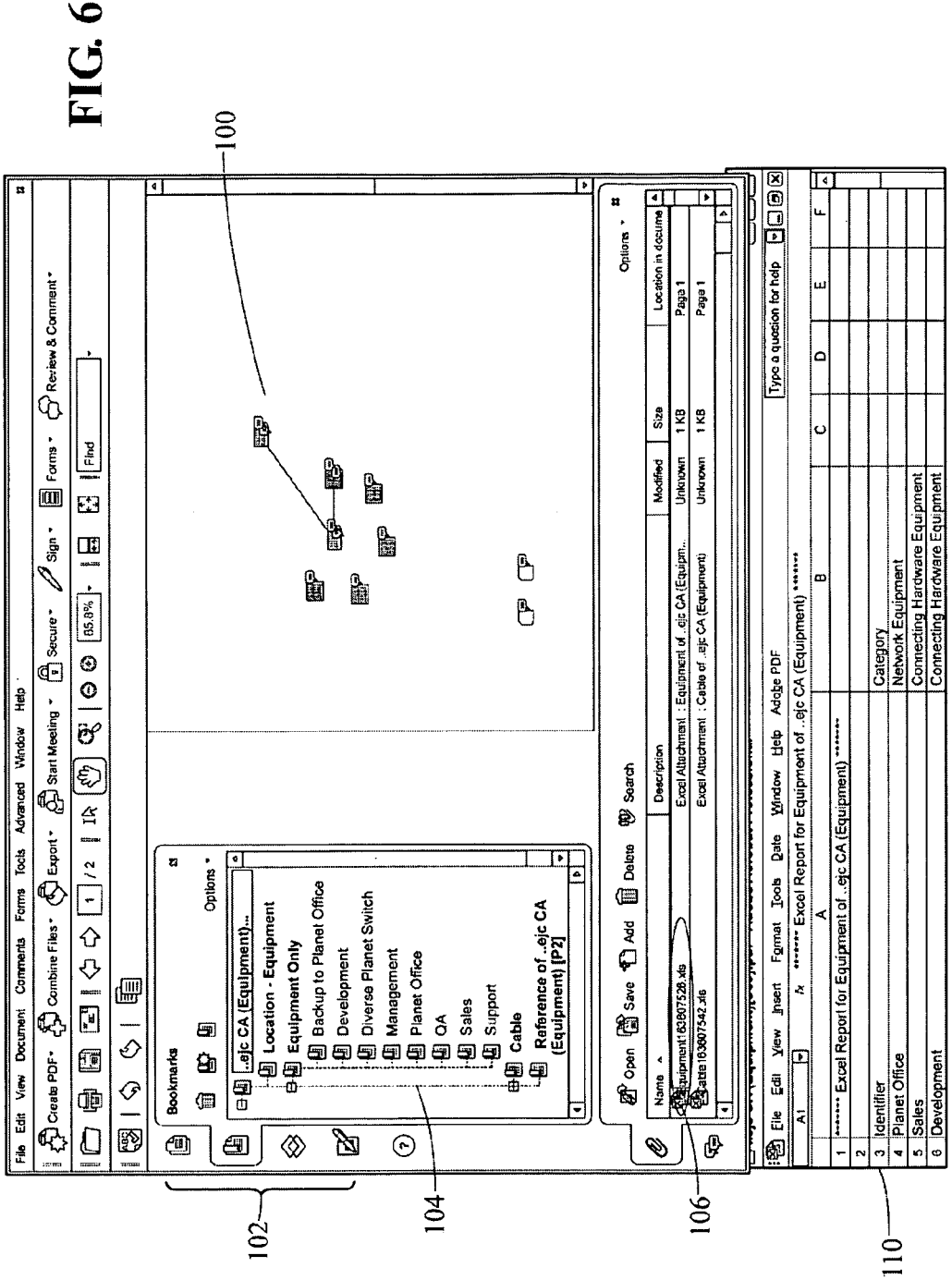
FIG. 6 is a end-user display of embedded documents.

In FIG. 6, the display has been updated to show that the user has highlighted and opened an attached file 106 in the form of a Microsoft Excel spreadsheet file 110 containing information relevant to equipment featured in the intelligent portable document. The spreadsheet can contain any relevant information from the IMS as required by the template from which the document has been generated. This information may include, but is not limited to, equipment model and serial number information, operating and configuration parameters. Access to the embedded file may include read only rights or read and write access rights thereby allowing the user to update the file, to include by way of example new serial numbers for swapped equipment or new operating parameters.

Embedded files (FIG. 7) may also be used directly in the intelligent portable document, such as picture or configuration diagrams of various pieces of equipment. Embedded files are listed in a table 112 by type such as from a product library or cable library, such names refers to the corresponding equipment and description that describes information relevant to the image. As will be illustrated later these files may be associated with equipment shown in the map window. Furthermore, additional files can be added by the user so by way of example a digital photo taken of an new rack configuration with new equipment may be added to the intelligent portable document to for transmission back to the IMS.

In addition, hypertext links (FIG. 8) can be included with links to other information outside of the intelligent portable document, such as a URL to a map website 114 such as by way of example, Google maps illustrated in the picture. The URL for the map website is located within a bookmark and also corresponds to a physical location on a map. The image of the map found in the intelligent portable document is shown at a resolution of 2.66% and is of the 50 States. By use of the hyperlink the map information may be tied to a global positioning device. For example, it will further be appreciated that in this way other equipment may be addressed and accessed such as GPS navigational device in which the URL may direct a networked GPS device to provide direction to a location. Comment fields may be populated with relevant information such as entrance procedures for each facility and the equipment configuration, testing and life cycle information. Form fields generated by the user from metadata-configured tools can be used to update rack configuration information.

Figure 9:
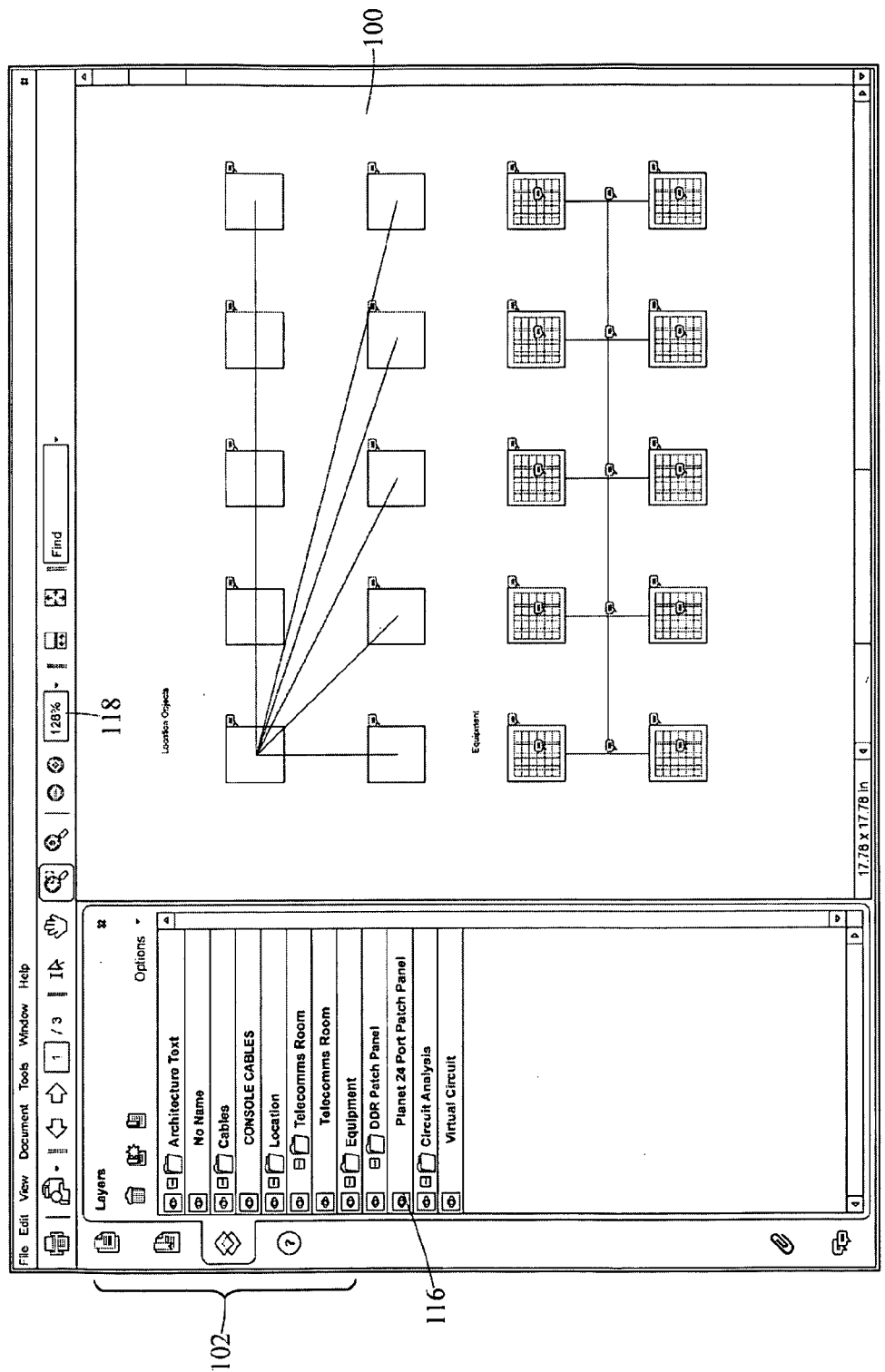
FIG. 9 is an end-user display of IT infrastructure loaded from an IT database.

With reference to FIG. 9, an index of layers 116 is shown for architecture text, cables, location, equipment and circuit analysis. The map is shown at an exemplary resolution of 128% at 118 in which the cabling and rack information is associated with one and another. Various cables may be color coded to convey different characteristics such as the data conveyed on the line or the ownership rights.

Figure 10:
FIG. 10 is an end-user display of IT infrastructure loaded from architecture files.

Furthermore, it may be appreciated that different layers of information may have meaningful information covered at different levels of resolution. By way of example, street map and name information (FIG. 10) taken from IMS architecture files may be used to show the spatial relationship between different equipment locations. Users can switch between a view for example of the US shown in FIG. 8 to a rack view shown in FIG. 9 to a map view of street name as shown in FIG. 10 may be viewed by changing the zoom resolution of the file being viewed. By way of example the street information of viewed in FIG. 10 is shown at a resolution of 447%. Although the depth of the resolution will vary depending upon the range and scale of the information conveyed in each file, the zoom resolution available in the PDF version 1.6 format is from 1% to 3200%. Those skilled in the art will appreciate that such a resolution difference would allow for maps to scale from a view of the entire US to a view showing a rack of equipment in an IT facility. The exact scale required to view say a rack, street map or statewide view of IT facilities would depend upon the scale range of the file created. For example, if the file only related to IT equipment in one state or one city, the scale range would be different when considering for example the sale range for a file relevant only to Los Angeles versus a file relevant to the state of California as a whole.

Furthermore with regard to FIG. 10, it should be noted that the layer index 116 is marked with an icon illustrated here as representative of a pair "eyes" at 120 indicating that all layers are currently viewable. The architecture lines folder and architecture text folders include layers for various communications trunk lines and streets with identifying textual information.

Should a maintenance crew need to locate the Telco facility on the map in FIG. 10, the user can simply use the find command to bring out a search window conventional to Acrobat Reader and search the text in the layers for the street name. By Selecting the found reference for the street name in the find results (not shown), the user is shown on the page with highlighted text where the street is found. Similarly searching for a Telco facility by a facility identifier or a piece of equipment by a serial number could be used to render similar search results and locate the facility or equipment on the page.

Figure 11:
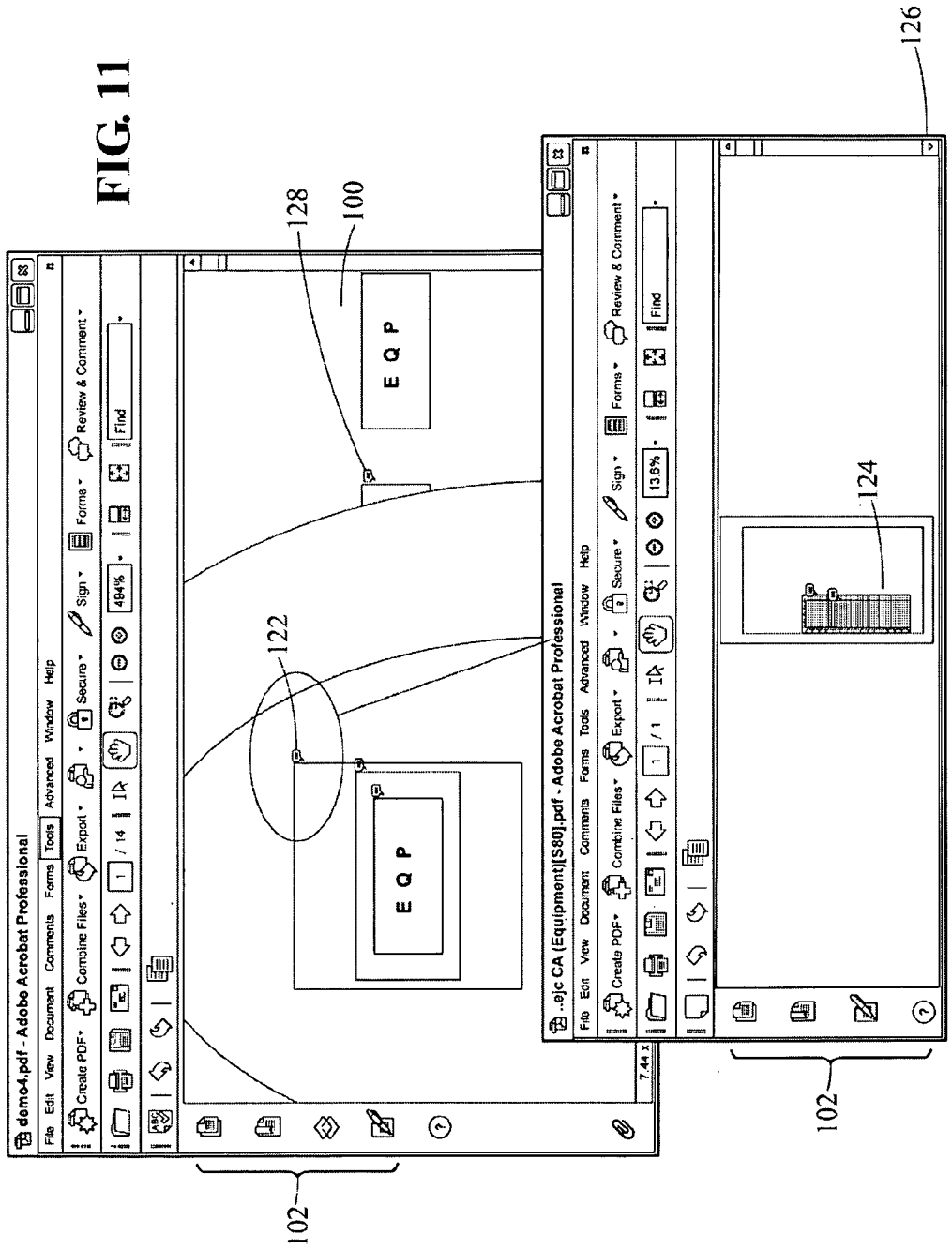
FIG. 11 is an end-user display of IT infrastructure linked to a window having detailed rack elevation information.

With reference to FIG. 11, a resolution showing various equipment racks in an IT facility are shown in a diagrammatic view. A link 122 on an equipment rack block may be used to access one of the embedded graphics files 124 in a separate window 126 that show a side elevation view of the rack configuration. Similarly other graphic can include information such a panel settings and wiring configuration for each piece of equipment. Comment fields 128 may be populated with relevant information such as entrance procedures for each facility and the equipment configuration, testing and life cycle information. Form fields generated by the user from metadata-configured tools can be used to update rack configuration information.

Figure 12:
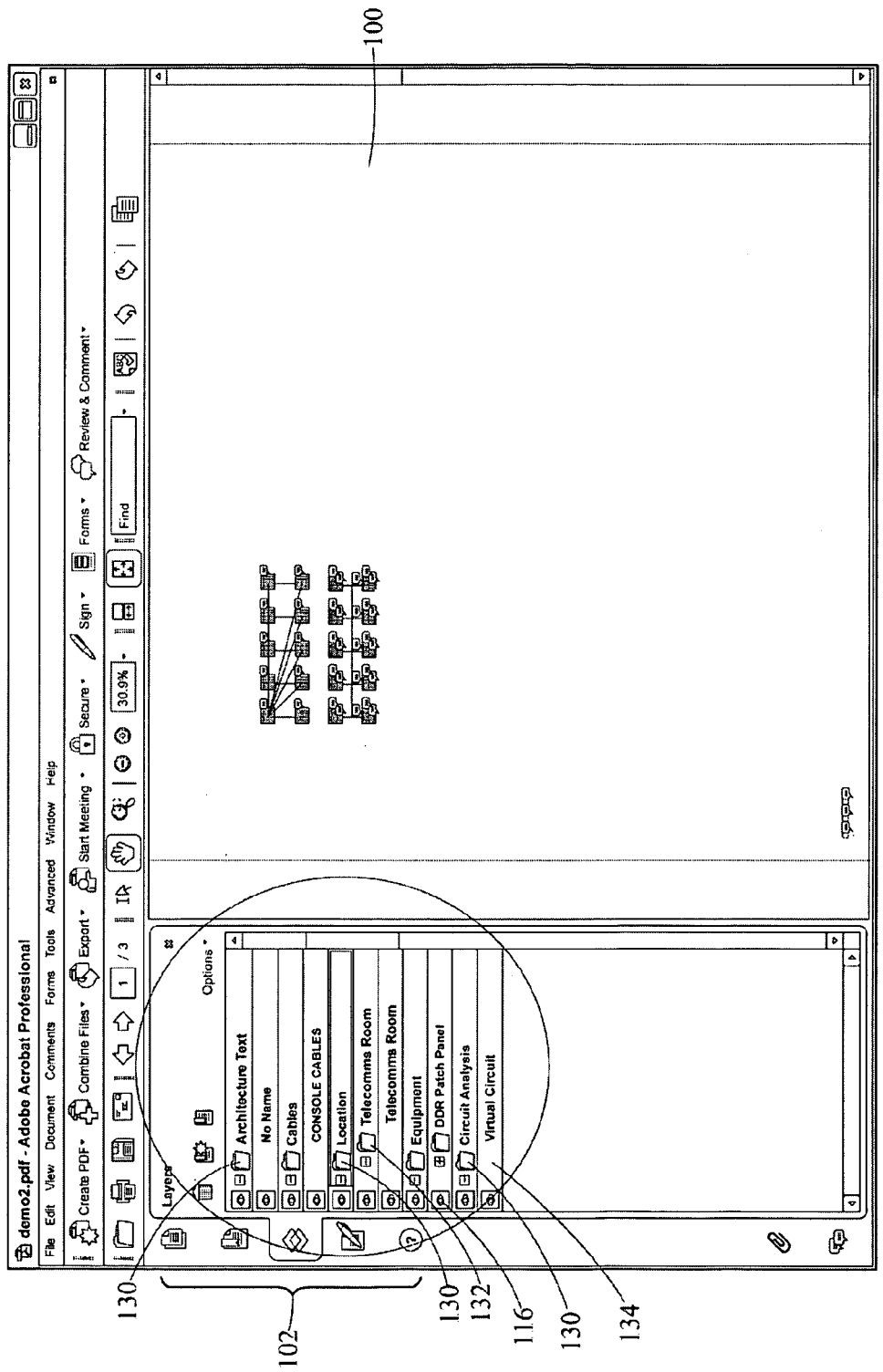
FIG. 12 is an end-user display of IT infrastructure having an index of document layers associated with an IMS navigational hierarchy.

With reference to FIG. 12, the index of layers illustrates that the layers are grouped by various levels of hierarchy 130, 132 and 134. The layer hierarchy can be defined in the template for generating the intelligent portable document; however, nesting is generally ordered to by various levels of zoom resolution. Thus layers having useful information at a lower zoom value are ordered at the top and layers having their useful information viewable at a higher zoom value are ordered near the bottom.

Figure 13:
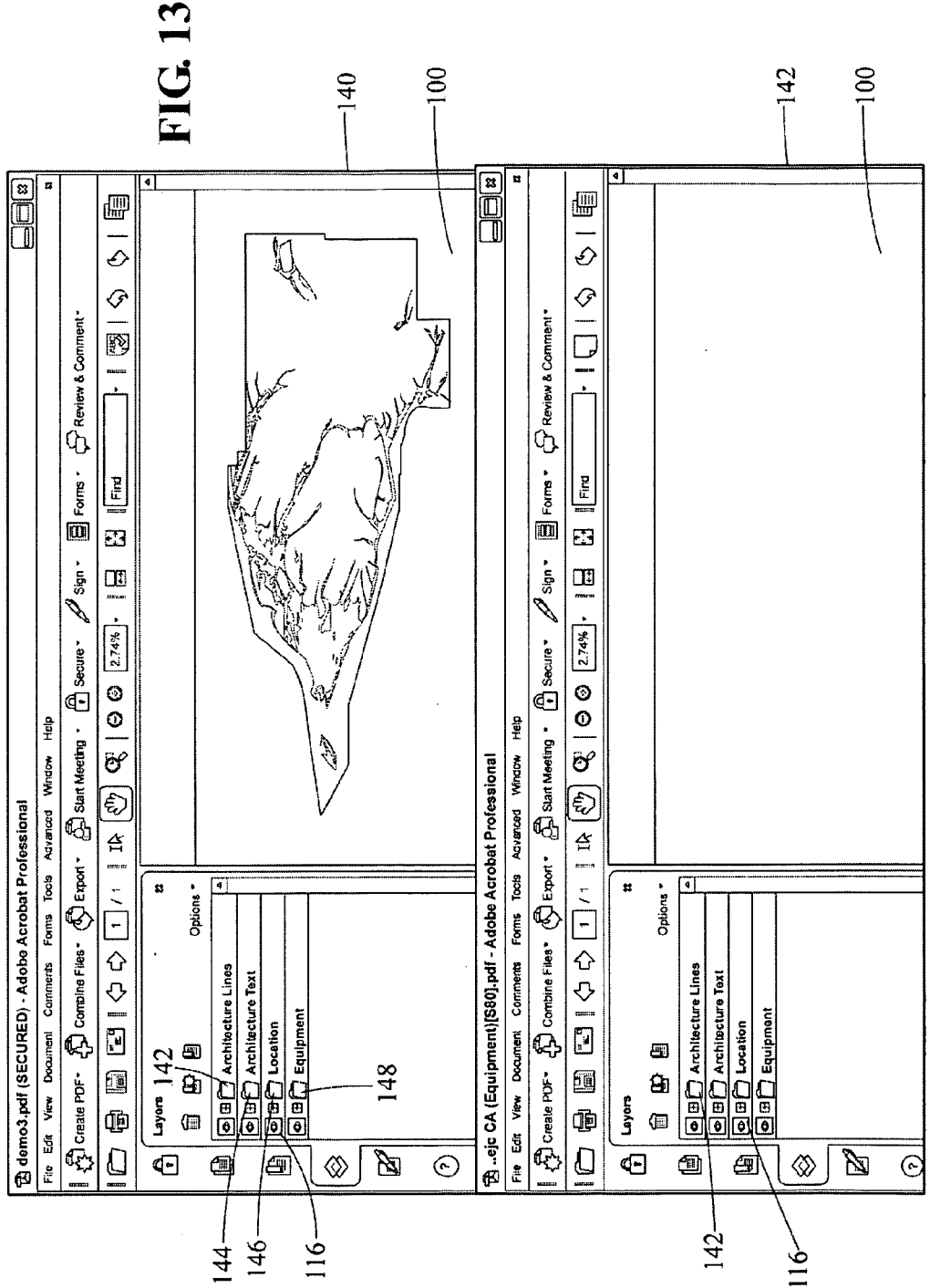
FIG. 13 is an end-user display of IT infrastructure information filtered by selective layer views.

In FIG. 13, two windows of the same map field of view 100 are displayed on a screen view. The upper window 140 shows all layers being viewable including, by way of example, layer categories such as architecture lines 142, architecture text 144, location 146 and equipment 148. In the Lower window 150' layers that are in the architecture lines 142 have been switched off as indicated by the absence of an eye next to the category label. A few remaining points at 148 on the map view 100 relate to IT facilities and IT equipment shown in the map with reference topology being shown. Any category of layers may be switched on in this way. Furthermore, individual layers within categories or subcategories may be switch off in this way. For example, if a repair crew were tasked with maintenance at certain IT locations, other IT facilities could be selectively switched off from view.

Locating certain facilities and equipment can further be facilitated by the use of bookmarks 104 (FIG. 14) that may be linked to various equipment types, locations, cabling or even circuits. By selecting a bookmark for a particular location of equipment, the bookmarked equipment is centered in the viewing window and a resolution appropriate to the information is conveyed.

A more detailed example of the possible configuration for such transferable files is disclosed in U.S. Provisional Application Ser. No. 60/945,058 and which has already been incorporated herein by reference.

Figure 15:
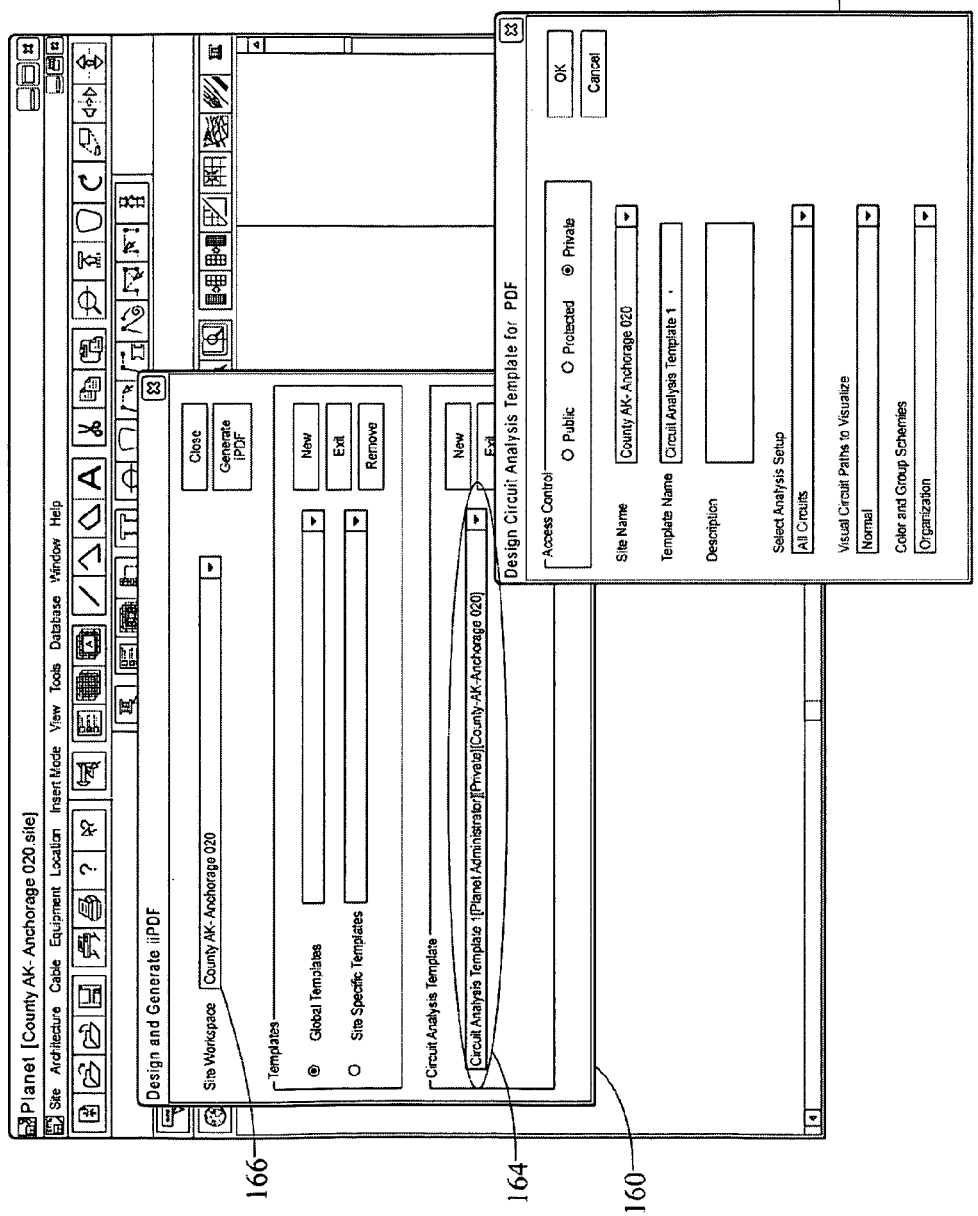
FIG. 15 is an end-user display from the design template engine.
Figure 16:
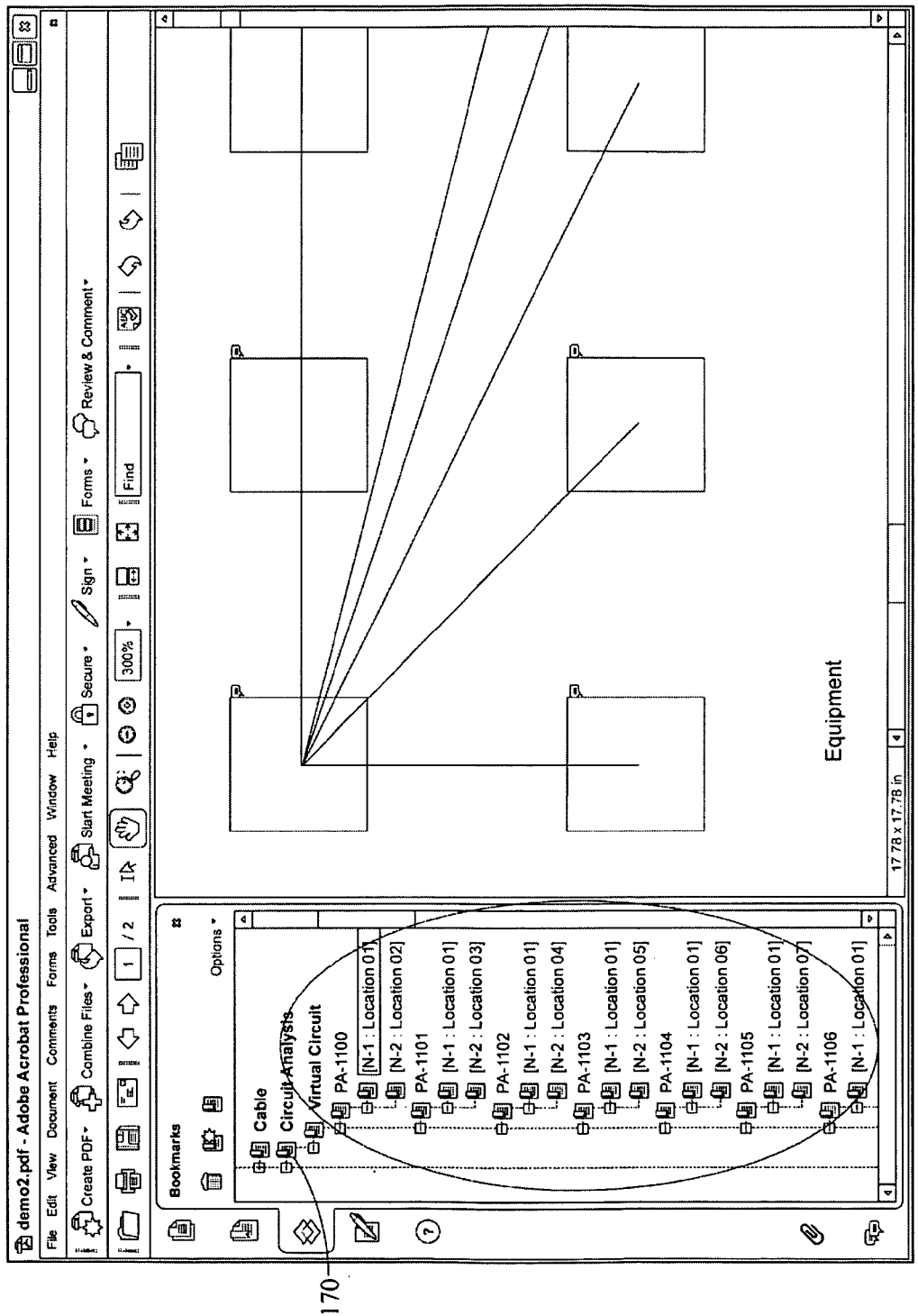
FIG. 16 is an end-user display of a portable document populated with analytical information.

With reference to FIG. 15, a portion of the Design Template Engine user interface 160 and 162 is shown in which a user designing an intelligent portable document may designate various layers of information 164 and various geographic regions 166 to then generate and populate an intelligent portable document. In this exemplary document, a user has selected a circuit analysis template for all circuits located within the county of Anchorage Ak. When next selecting the generate intelligent portable document format button, the intelligent portable document is generated in real time reflecting circuit analysis information 170 for the IT equipment in the Anchorage Ak. region (FIG. 16)

From the examples described above it should be understood that the potential for this kind of encapsulated database has real value for any infrastructure usage in which gas mains, water lines, Telco and electrical utility are needed to be located. For example, when an emergent situation is required and first responders such as police or fire fighters are called out, a transferable file of infrastructure information may be transmitted to a remote PC to identify relevant infrastructure information relevant to the emergency such as in the case of fire, the location of water line hook ups and gas main valves.

Thus, transferable files generate intelligent PDF reports in real-time from information stored in an IRM database. The Export Engine generates and distributes the IRM data (available in IRM database) after converting the data in real-time as secure PDF documents. The Import Engine also collects users' remarks and revisions in the form of metadata.

Figure 5:
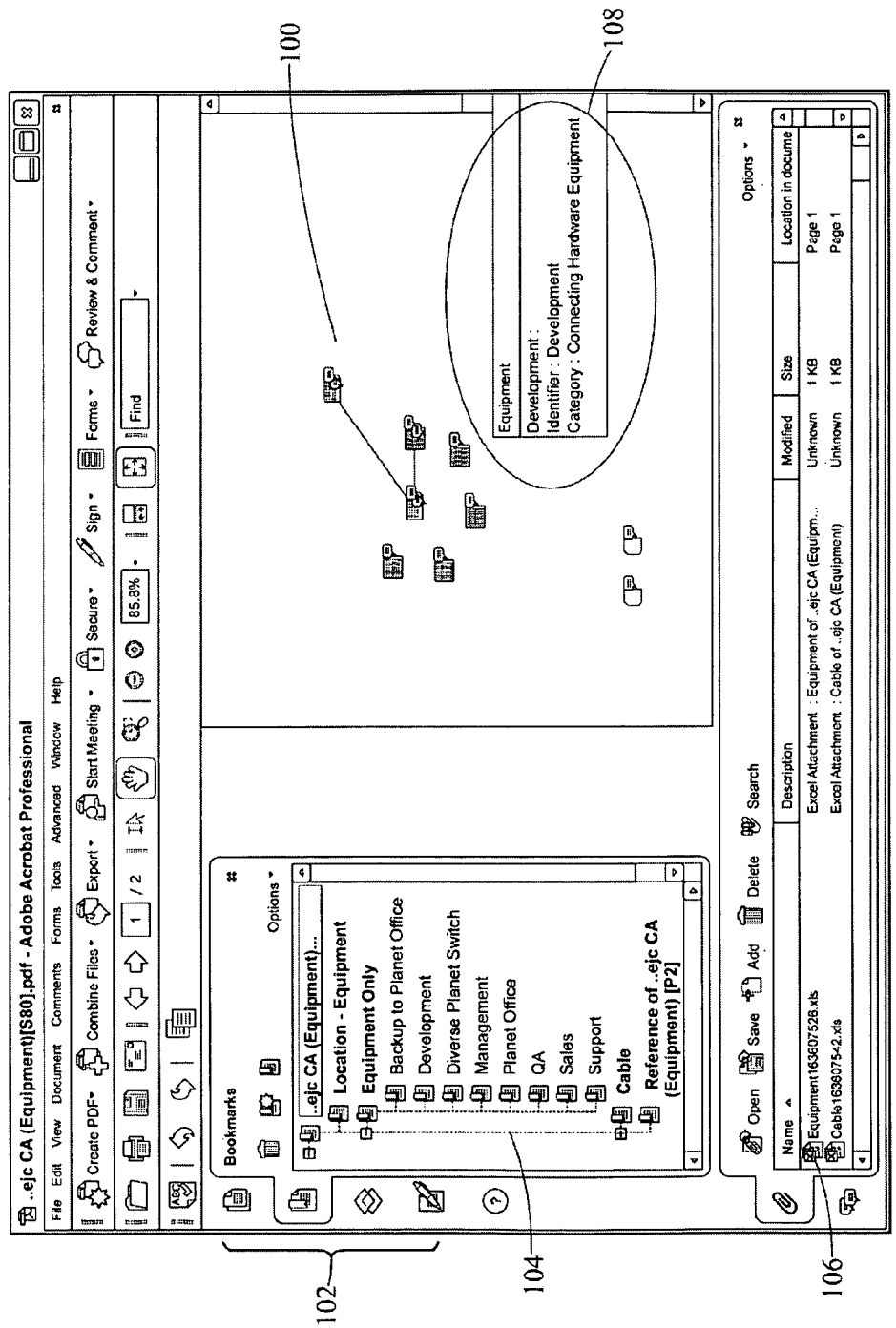
FIG. 5 is a end-user display of a mouse-over tool tips function.
Figure 7:
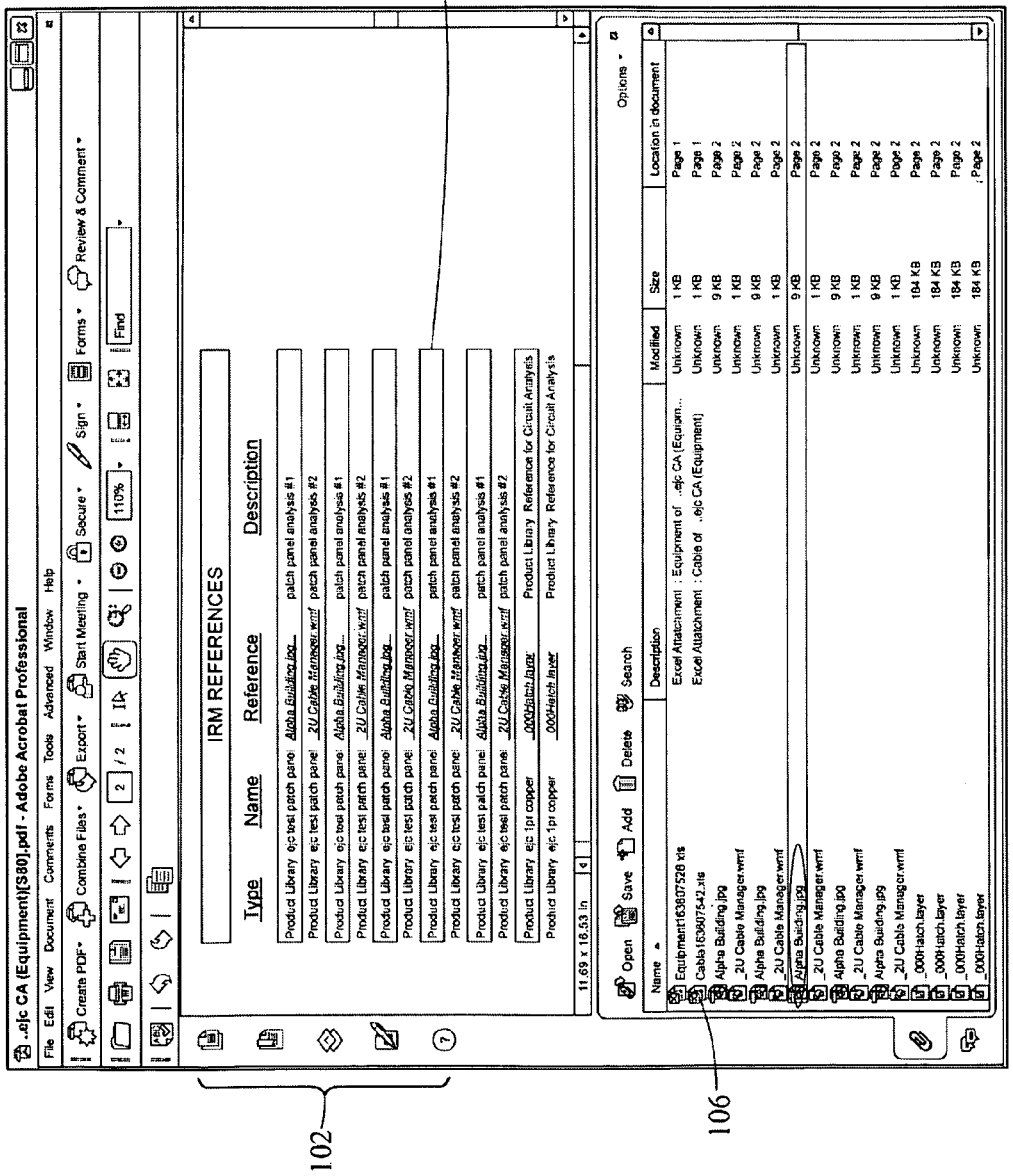
FIG. 7 is an end-user display of embedded reference files.
Figure 8:
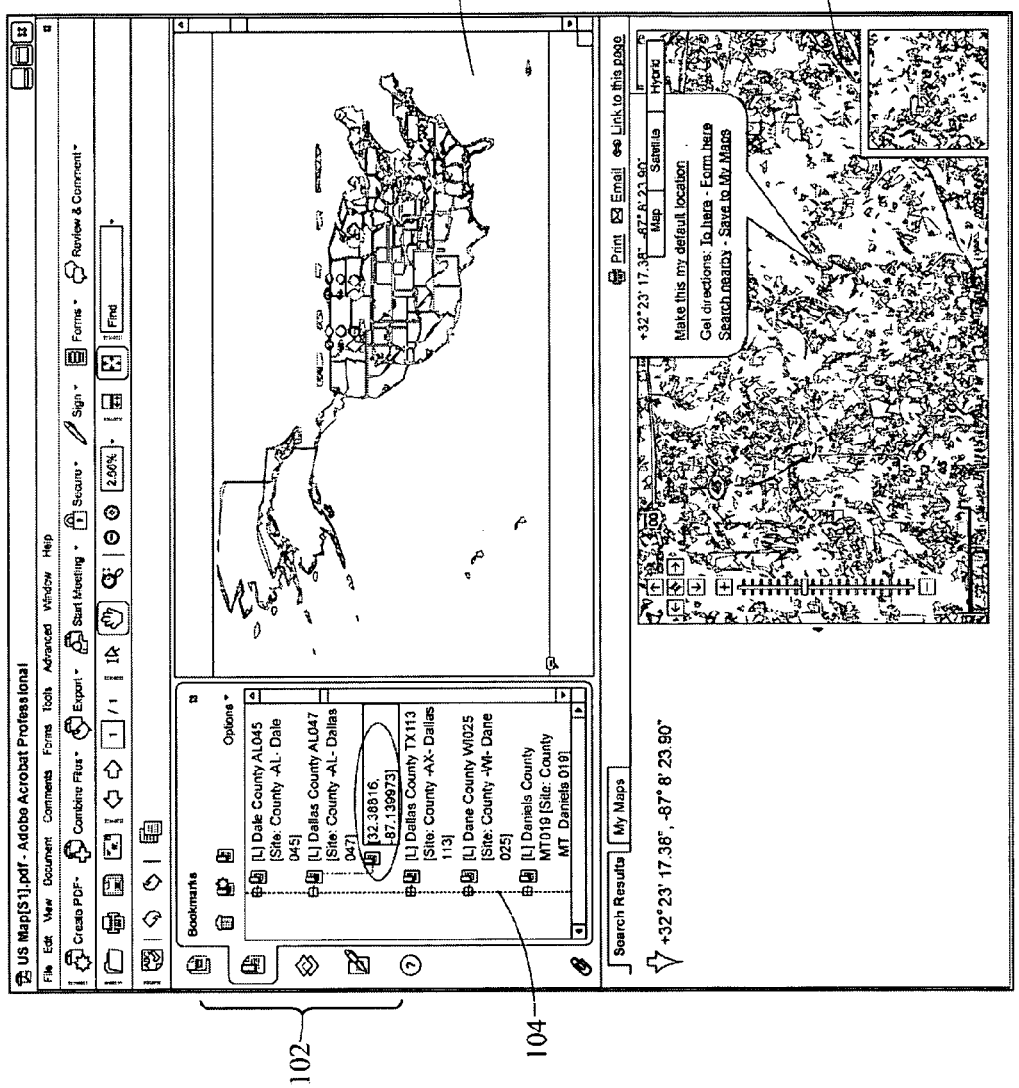
FIG. 8 is an end-user display of embedded hypertext links and viewing frames.
Figure 14:
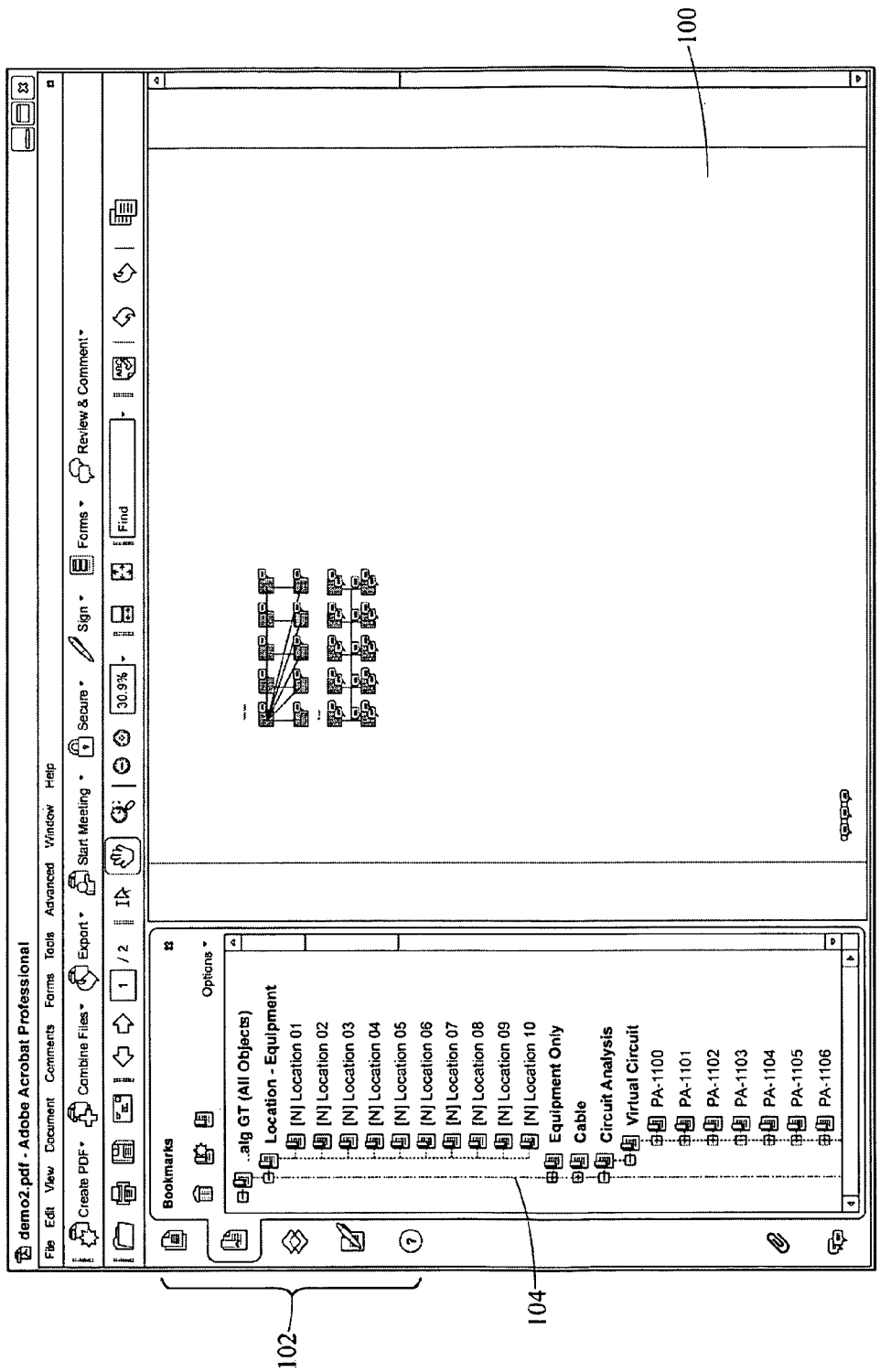
FIG. 14 is an end-user display of IT infrastructure linked to linked to bookmarks for equipment navigation.

In summarizing, intelligent portable document is capable of:

Provide data information
Mouse-over tool tips: FIG. 5.
Excel data: FIG. 6.
Reference files: FIG. 7.
Web links: FIG. 8.
Provide visual information
Load location, Equipment, Cable, Circuit from Database, and display transparent icons, colored lines and texts in PDF files. FIG. 9.
Load basic shape information such as street and road from Architecture file, and display colored lines and colored text in PDF files. FIG. 10.
Load detail Rack elevation window, and embed it into PDF files. FIG. 11. PDF
Provide layered PDF file
Classify layers based on the business logic and terms used by users. FIG. 8.
Associate layers to a group of objects. FIG. 12.
Visually filter out some groups of object by layers. FIG. 13.
Provide portable PDF via web portal or windows workstation in multi-user, secured management system in the real-time.
Generate the document in the real-time in the secured web or windows system.
Manage the intelligent document by Template authors. Templates are protected by the IRM user-group management system.
Generate the intelligent document by regular users with correct permissions.
Protect a single PDF files by user defined password.
Provide user-definable, structured, and analytic information via PDF
Define layers based on the users' infrastructure.
Define Bookmark based on the IRM Site workspace infrastructure. FIG. 14.
Provide analytic information. For example, circuit analysis by circuit type, by object type, and etc. FIGS. 15 and 16.
Build template with query mechanism, layer filters, object type filters, data and visual information selection, and other algorithms.

Other features can include:

Data Authoring: Customers use Planet IRM as tools to manage and analyze their data.
Data Export: Data from an IRM Database is exported into the Import/Export system, which generates PDF files.
Data Import: the Import/Export system imports users' information to the IRM Database.
Distribute Data to Users: Distribute PDF file, embedded metadata, embedded MS Excel, etc. to users.
Collect Data from Users: Collect the data from end users by using PDF forms, PDF remark layer, metadata, etc.
In order to better serve users (such as first responders during critical times), the transferable files system was developed for use with an IRM DBMS.
With transferable files authorized remote users login into a web server over the Internet and instantly request the creation of up-to-the-minute multi-layered transferable files with embedded tool tips, equipment inventory spreadsheets, parent-child hierarchy links, and other enhanced capabilities.
These resulting password-protected transferable files can easily be viewed by authorized users with Adobe Reader® 8 software, without accessing IRM database directly.
The Adobe users can manipulate layer visibility and use Adobe's Reader Extension functionality to annotate changes for updating the IRM source application.
Transferable files allows IRM users to create global and site-specific file export templates to manage PDF output format, content, layers, and permissions. Site-specific template creation is restricted to authorized site content only. Authenticated local or remote users can access these templates (or create new ones) through the web server to:
Export all or part (via boundary box) of selected site workspace data to a transferable file and create an instant "picture" of the current site configuration;
Use multiple queries to narrowly define equipment/cable/location selections;
Create password-protected text-searchable PDFs containing manageable layers, tool-tips, watermarks, embedded spreadsheet reports, equipment information, parent-child links, virtual circuit information, circuit/bandwidth analysis results (in the form of tables or charts), etc.; and
Distribute transferable files quickly and easily to anyone with access to an appropriate document reader.
Authorized Adobe Reader users will be able to:
Parse critical data information via managed layers;
Access detailed equipment, cable and location information via embedded tables and spreadsheets;

Add commentary and redline edits directly to the transferable files to designate infrastructure changes for updating the Planet IRM CMDB; and Transferable files increases Planet IRM's usability throughout an organization by extending a portion of Planet IRM's functionality without requiring the use of a local client terminal.

Transferable files is an essential tool for first-responders, field support personnel, and outside contractors: it puts real-time, up-to-date critical data in the hands of those who need it most—quickly and easily—while protecting the IRM database information with established security mechanisms.

Transferable files collects data and comments from users, then merges them together, and saves them back to the IRM database.

Transferable files are "intelligent" because the generated PDF files contain additional information, such as metadata, annotations, bookmarks, embedded Microsoft Excel, embedded video, etc.

Transferable files not only distribute IT infrastructure information to users but also collect information from users. There are two ways to gather information from users.

1. Using PDF forms or the PDF remark layer that enable users to input data. When transferable files gather the information from users, it can merge the information and store it into IRM database.
2. Using embedded files. For example, transferable files can embed XML metadata, Microsoft Excel, etc. User can input their information into the metadata, then transferable files can import those data back to the IRM database by using IRM data importing tool.

By using structured information including the PDF layer hierarchy, bookmarks, annotations and table reports, transferable files is able to provide comprehensive information about IT infrastructure in a single PDF file that can be viewed by ubiquitous PDF reader (Adobe PDF Reader)

Transferable files help users manage their data according to their business logic: Users can generate PDF files using Import/Export system based on different layer hierarchy. The PDF layer hierarchy is designed by users. For example, users can design PDF layer hierarchy based on IRM object classification such as locations, equipments, cables, and circuit analysis, or IRM service categories such as hardware, software, backup service and etc. The structured business logic in IRM can be represented by the layer hierarchy in PDF files.

Although the invention has been described in terms of exemplary embodiments, it is not limited thereto. Rather, the appended claims should be construed broadly, to include other variants and embodiments of the invention, which may be made by those skilled in the art without departing from the scope and range of equivalents of the invention.

What is claimed is:

1. A computer system including a processor under the control of software for transferring at least a portion of an information management system comprising:
    a file for use on a computing device;
    a generating engine to generate in real-time said file by synthesizing information from diverse data sources, said diverse data comprises a database, architecture files, icons, images and reference data files;
    said file is encapsulated with data including layered objects ordered by a database layer hierarchy and an information management interface for managing the display of one or more layered objects on a display;
    wherein said file is then transferable to a user that is not directly connected to the information management system
    wherein said generating engine includes a template parsing engine for collecting data from database layer hierarchy, database infrastructure information, file references, web references and database visual and data information;
    such that said file is configured with:
    layered objects in response to said database layer hierarchy;
    bookmarks in response to said database infrastructure information;
    embedded files in response to said file references;
    web links in response to said web references; and
    data and visual objects in response to said database and visual information,
    wherein said information management interface includes a control to adjust resolution of said file viewed on the display wherein changing resolution in different degrees gives plurality of distinct views, the plurality of distinct views comprises a map view, a rack view and a street view.

2. The system of claim 1 wherein said file is portable to different computing platform architectures.

3. The system of claim 1 wherein said file is password protected.

4. The system of claim 1 wherein the information management system can accommodate at least two types of users where a first type has full access to said information management system and said second type has reduced access to said information management system.

5. The system of claim 4 wherein:
    for said first type user, said file is generated in real time upon a request;
    wherein said second type user can request said file in real time tailored to a user task.

6. The system of claim 5 wherein said generating engine include file templates tailored to information permission levels;
    whereby said second type users are each assigned to at least one of the information permission levels.

7. The system of claim 6 wherein users access templates at an assigned user level from a server running said generating engine and connected remotely via an internet connection;
    said generating engine utilizes said templates to configure said to said user task.

8. The system of claim 1 wherein said template parsing engine receives input from said information management system which includes a database, a circuit analysis engine, a user define query engine and a security engine.

9. A computer system including a processor under the control of software for
    transferring at least a portion of an information management system comprising: a file for use on a computing device;
    a generating engine to generate in real-time said file by synthesizing information from diverse data sources, said diverse data comprises a database, architecture files, icons, images and reference data files;
    said file is encapsulated with data including layered objects ordered by a database layer hierarchy and an information management interface for configuring the display of one or more layered objects;

wherein said file is then transferable to a user that is not directly connected to the information management system wherein said generating engine includes a template parsing engine for collecting data from database layer hierarchy, database infrastructure information, file references, web references and database visual and data information;

such that said file is configured with:

layered objects in response to said database layer hierarchy;

bookmarks in response to said database infrastructure information;

embedded files in response to said file references;

web links in response to said web references; and data and visual objects in response to said database and visual information, wherein said information management interface includes a control to adjust resolution of said file viewed on the display wherein changing resolution in different degrees gives plurality of distinct views, the plurality of distinct views comprises a map view, a rack view and a street view.

\* \* \* \* \*